United States Patent [19]

Okuyama

[11] 3,905,261
[45] Sept. 16, 1975

[54] APPARATUS FOR SCORING A STRIP OF GLASS SHEET

[75] Inventor: Teruo Okuyama, Tsu, Japan

[73] Assignee: Central Glass Co., Ltd., Ube, Japan

[22] Filed: May 22, 1974

[21] Appl. No.: 472,128

[30] Foreign Application Priority Data
May 31, 1973  Japan............................ 48-60352

[52] U.S. Cl. .................. 83/11; 83/326; 83/353; 83/479; 83/487
[51] Int. Cl.² ........................................ C03B 33/02
[58] Field of Search ......... 83/11, 10, 353, 326, 479, 83/486, 486.1, 487, 488, 614, 618; 225/96, 96.5, 2, 4

[56] References Cited
UNITED STATES PATENTS

| | | | |
|---|---|---|---|
| 3,282,140 | 11/1966 | Sasabuchi et al. | 225/96.5 X |
| 3,319,500 | 5/1967 | Wild et al. | 83/353 |
| 3,704,642 | 12/1972 | Dryon | 83/11 |
| 3,742,793 | 7/1973 | Gray et al. | 83/11 X |
| 3,807,261 | 4/1974 | Couvreur | 83/11 X |

Primary Examiner—Frank T. Yost
Attorney, Agent, or Firm—Woodhams, Blanchard & Flynn

[57] ABSTRACT

An apparatus for scoring a strip of glass sheet, comprising a set of cutters capable of reciprocating motion along a set of guide rails so installed as to stretch over said strip of glass sheet in conveyance, said cutters being so devised as to touch and score the strip of glass sheet at the time of forward stroke and part from the strip of glass sheet to return to the original position thereof without scoring the strip of glass sheet at the time of backward stroke, which apparatus is characterized in that said set of guide rails consists of two guide rails, one guide rail being in front and the other in the rear relative to the direction of conveyance of the strip of glass sheet, and said set of guide rails consists of two cutters, each being mounted on the respective guide rails to be capable of reciprocating motion along the guide rail simultaneously and in opposite directions in such a fashion that when one cutter reaches the terminal point for scoring the other cutter reaches the starting point for scoring.

8 Claims, 6 Drawing Figures

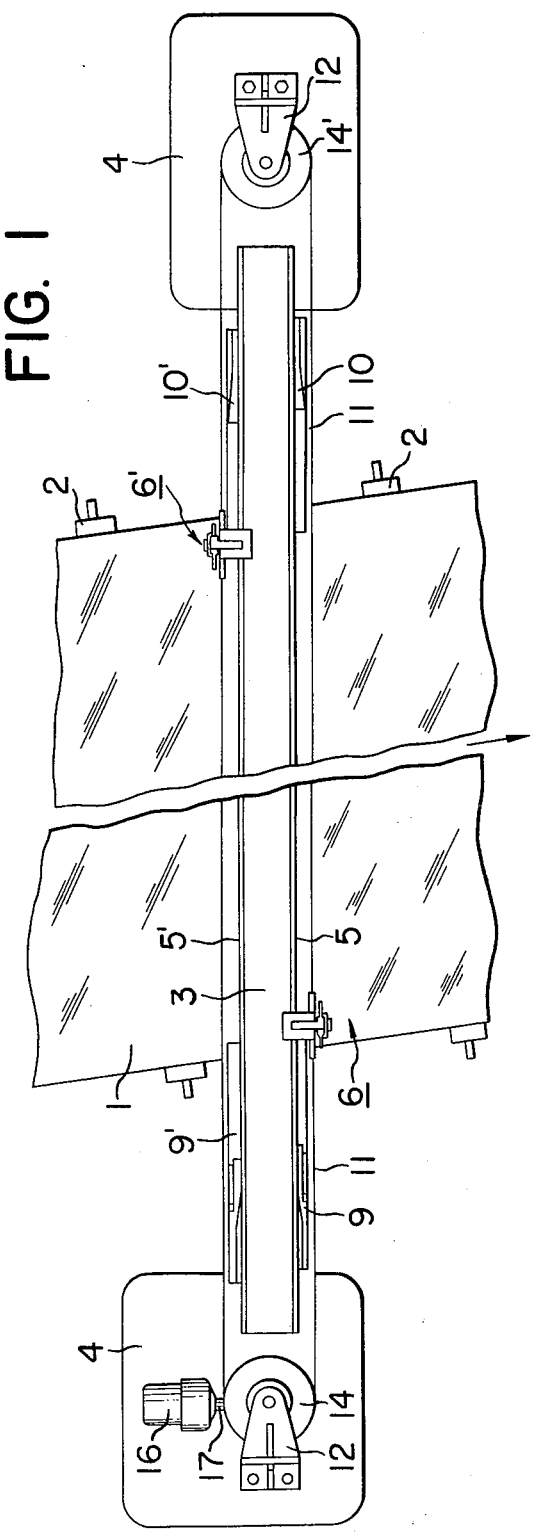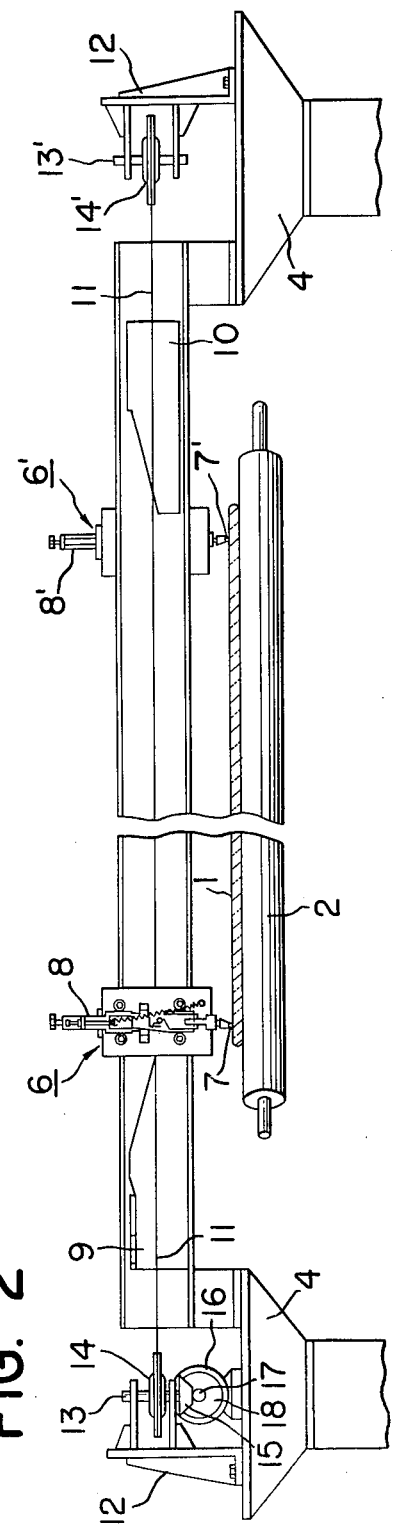

FIG. 4
FIG. 6
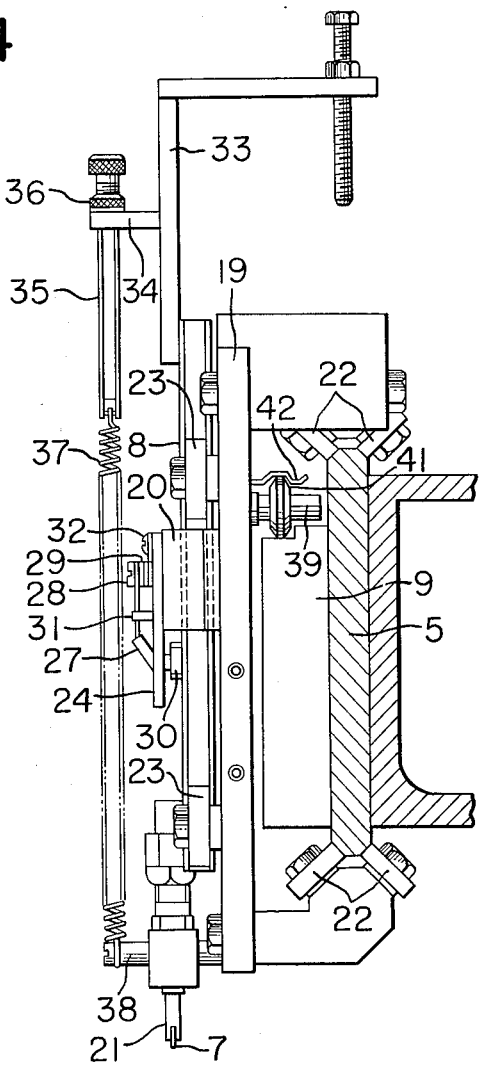
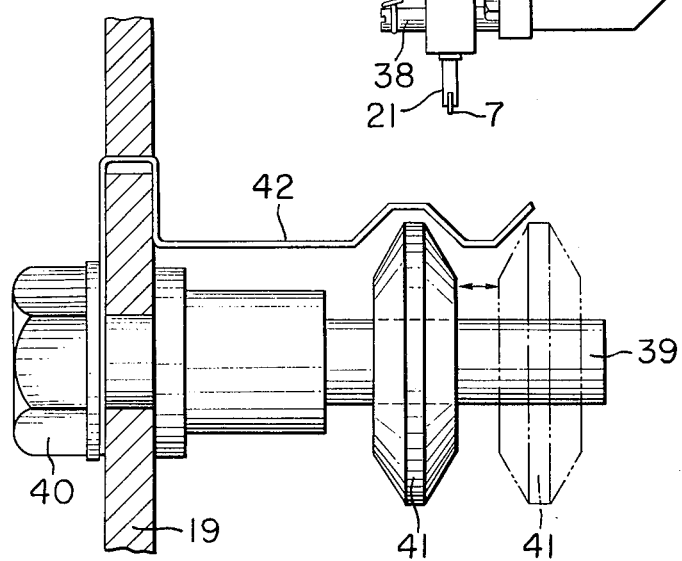

APPARATUS FOR SCORING A STRIP OF GLASS SHEET

BACKGROUND OF THE INVENTION a. Field of the Invention

The present invention relates to an apparatus for scoring a strip of glass sheet in conveyance.

b. Description of the Prior Art

The conventional apparatuses for scoring a moving glass sheet perpendicularly to the direction of movement thereof have been so devised that a cutter is mounted on a guide rail stretched aslant over said glass sheet to make reciprocating motion along said guide rail, at the time of forward stroke said cutter touches the glass sheet to score it, and at the time of backward stroke said cutter parts from the glass sheet to return to its original position without scoring the glass sheet. According to such a conventional apparatus, inasmuch as the glass sheet is continuously conveyed even at the time of backward stroke of the cutter, it has been impossible to make the intervals of scores shorter than the regular intervals determined by the speed of conveyance of the glass sheet and the time required for the backward stroke of the cutter.

Therefore, in case of cutting a glass sheet at intervals shorter than the above determined minimum intervals of scores, it has usually been performed either by once cutting the glass sheet at intervals of scores applied by the foregoing scoring apparatus and then manually cutting the thus cut glass sheet into shorter sheets of glass or by installing two units of the foregoing scoring apparatus along the course of conveyance of the glass sheet to thereby score the glass sheet with one apparatus and further score the thus scored glass sheet with the other.

However, the manual cutting in this way not only is inefficient but also requires additional working personnel entailing an increase of cost; while the provision of two units of said scoring apparatus not only means so much increase of cost but also requires provision of separate driving mechanism as well as controlling mechanism for each unit, entailing an additional cost of equipment and a remarkable increase in the whole expenses, and besides a lowering of accuracy of the intervals of scores is unavoidable due to possible difference of properties of the respective driving mechanism as well as controlling mechanism for each of these two scoring apparatuses.

SUMMARY OF THE INVENTION

The primary object of the present invention is to provide an apparatus for scoring a strip of glass sheet, which is capable of overcoming the afore-mentioned defects of the conventional scoring apparatuses.

Another object of the present invention is to provide an apparatus for scoring a strip of glass sheet, wherein two guide rails are disposed parallel to the direction of conveyance of the glass sheet, and two cutters, i.e., one cutter for each guide rail, are mounted on said guide rails to be capable of reciprocating motion along them in such a fashion that simultaneously with the forward stroke of one cutter to score the glass sheet the other cutter parts from the glass sheet and a backward stroke and at the termination of scoring work by one cutter the other cutter is in a position to start scoring work, thereby rendering it possible to perform the scoring of glass sheet at shorter intervals of scores than the minimum intervals to be afforded by the employment of one unit of the conventional scoring apparatus and to cut down expenses as said scoring work requires no additional hands.

A further object of the present invention is to provide an apparatus for scoring a strip of glass sheet, wherein two cutters mounted on two guide rails are interconnected by means of one chain and said chain is operated by one drive motor so that, compared with the conventional apparatuses of this kind requiring separate driving mechanism as well as controlling mechanism for two cutters in order to move them, the manufacturing cost is very moderate, the accuracy of the intervals of scores is superior and the space for installing the apparatus suffices to be less.

A still further object of the present invention is to provide an apparatus for scoring a strip of glass sheet, wherein different cams are installed near the two extremities of the guide rails, each cutter is installed on the lower end of a cutter carrier capable of ascending and descending along the cutter head capable of reciprocating motion along the guide rail, said cutter head is provided with a tripper member for holding said cutter carrier in an elevated position, said cutter carrier is provided with a cam follower to be engaged with said cam, and by virtue of the engagement of said cam follower with each cam, said cutter carrier is elevated and is held in the thus elevated position by means of said tripper member or it is made to descend by releasing it from the hold with said tripper member, whereby at the time of scoring a strip of glass sheet, the cutter can be held in a lowered position opposite to said scoring while at the time when scoring is not performed the cutter can be surely held in an elevated position above the glass sheet at an opposite distance therefrom and the foregoing switchover can be exactly performed without requiring any extra hands.

BRIEF DESCRIPTION OF THE DRAWING

In the accompanying drawings,

FIG. 1 is a plane figure of an apparatus embodying the present invention;

FIG. 2 is a front view of the apparatus shown in FIG. 1;

FIG. 4 is a cross-sectional view of the cutter head shown in FIG. 3 as cut along the line IV—IV and taken in the direction of the arrow;

FIG. 6 is a side view - on an enlarged scale - of the guide roller member of the apparatus shown in FIG. 1.

DETAILED DESCRIPTION OF THE INVENTION

Figure 3:
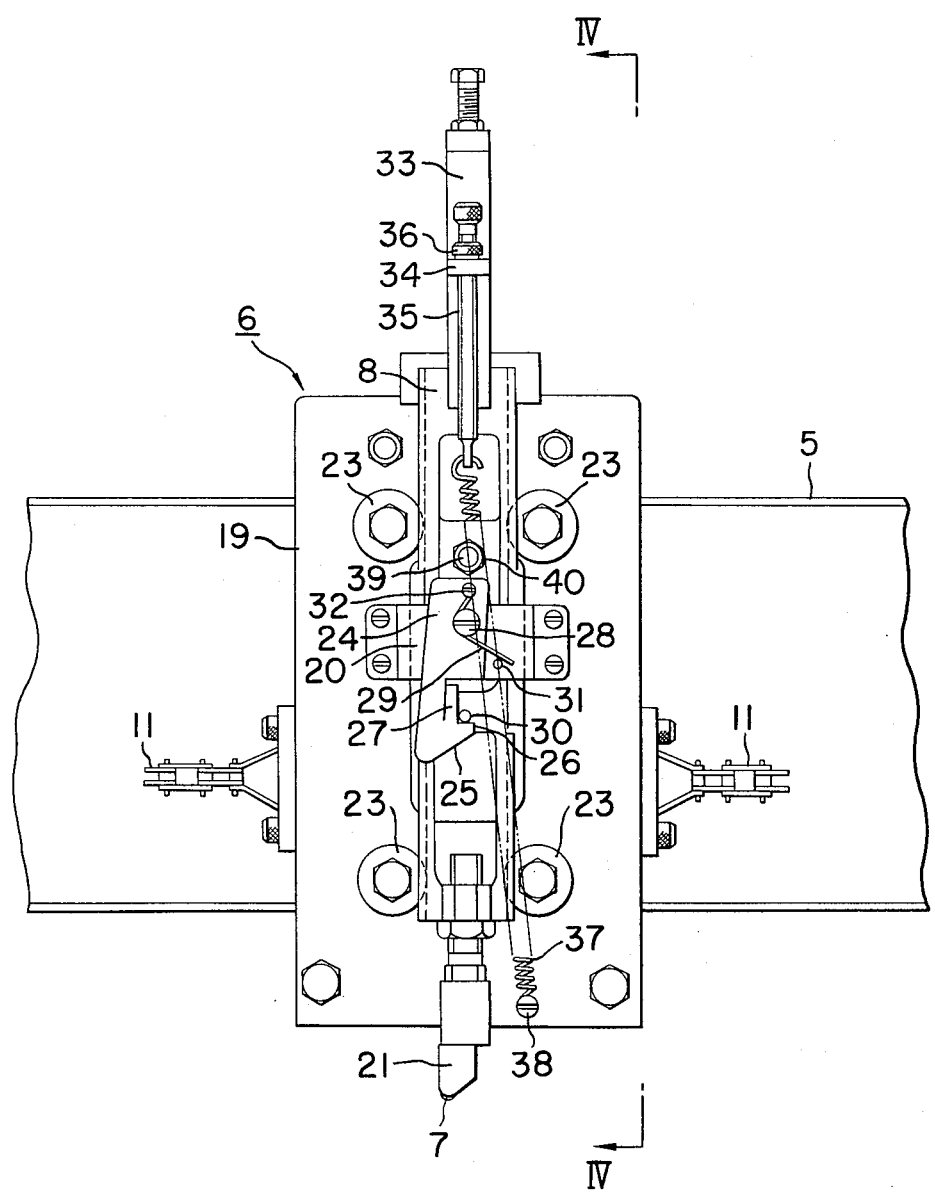
FIG. 3 is a front view - on an enlarged scale - of the cutter head of the apparatus shown in FIG. 1.

As shown in FIGS. 1 and 2, the glass sheet 1 is conveyed continuously on the conveying rolls 2.

Above the glass sheet 1 there is stretched the beam 3 in parallel with the plane of said glass sheet and aslant relative to the direction of conveyance of the glass sheet. Both extremities of the beam 3 are fixed on the cradle 4 installed on the outside of two edges of the glass sheet 1.

On both sides of the beam 3 there are installed the guide rails 5, 5', one rail being in front of the other along the direction of conveyance of the glass sheet 1, and on the guide rails 5, 5' there are mounted the cutter heads 6, 6', respectively, which are capable of reciprocating motion along said guide rails across the glass sheet 1.

The cutter heads 6, 6' are respectively provided with the vertically movable cutter carrier 8, 8' whose lower end is equipped with the cutter 7, 7', and in the proximity of both extremities of the guide rails 5, 5' there are provided the cams 9, 9', 10, 10' to make the cutter carriers 8, 8' ascend and descend.

Figure 5:
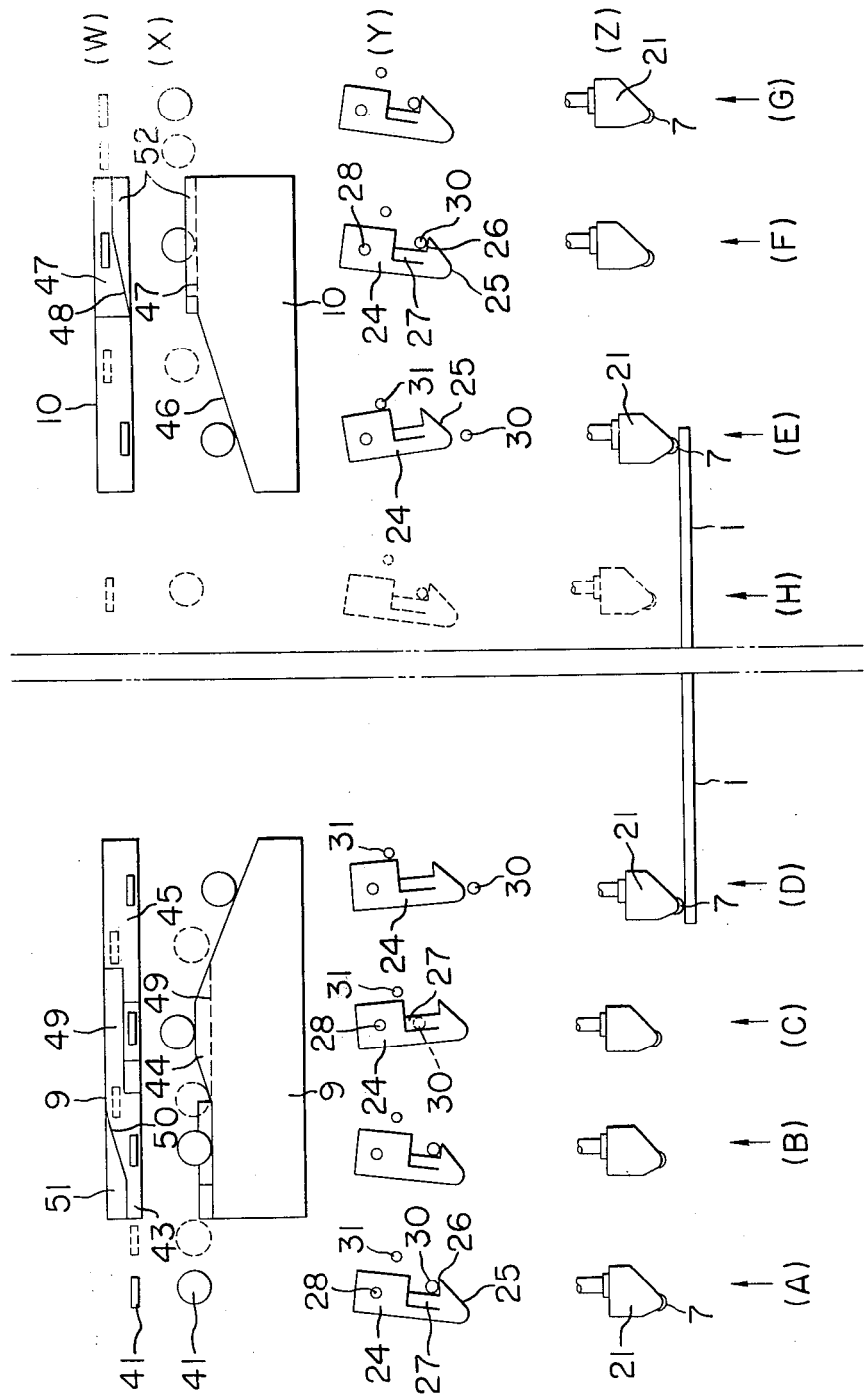
FIG. 5 is a schematic representation of the condition of actuation of the apparatus shown in FIG. 1, and is illustrative of the state of each member of the essential part of said apparatus at different points of time.

The cams 9, 9' are installed back to back on the opposite sides of the guide rails 5, 5' in the proximity of one extremity thereof while the cams 10, 10' are installed in the same way in the proximity of the other extremity thereof. The cams 9, 9' and the cams 10, 10', when placed back to back, are of symmetric construction, respectively, with their backs constituting the center of symmetry, so that, through explanation of the construction of the cams 9, 10, the construction of the cams 9', 10' will become clear of itself. Therefore, in the following will be discussed the construction of the cams 9, 10 with reference to FIG. 5 illustrative of the details thereof.

The cams 9, 10 are, as stated below, for the purpose of guiding the roller 41 installed on the cutter carrier 8, 8', and on the top face thereof there are provided the inside passage formed by the side of the guide rail 5 in parallel therewith and the outside passage formed on the opposite side of said inside passage.

For the convenience of explanation with regard to these cams, what is referred to as the rear side of the cam, 9, 10 hereinunder is a side of the cam disposed nearer to the center of the apparatus than the other side, that is, a side of the cam facing directly to the strip of the glass. And the opposite side of the cam should be referred to as the front side.

In the front of the horizontal inside passage 49 of the cam 9 there is formed the projection 51, and in the rear of this projection 51 there is formed the slant face 50 sloping inward. In the rear of the outside passage 43 which is horizontal and connected with the inside passage 49 there is formed the projection 44 whose front part slopes upward. The top of said projection 44 is horizontal and the rear thereof slopes downward to be merged with the slant face 45 in the rear of the inside passage 49.

The rear of the cam 10 forms the slant face 46 which slopes upward gradually toward the front to be connected with the horizontal passage 47 on the top of the cam, and the outside passage thereof is provided with the projection 52. In the rear of said projection 52 there is formed the slant face 48 sloping outward.

Both sides of the cutter heads 6, 6' are connected with the chain 11 stretched along the guide rails 5, 5', and said chain 11 engages with the sprockets 14, 14' fixed on the shafts 13, 13' supported rotatably by the supports 12 mounted on the cradles 4. On one end of the shaft 13 there is fixed the bevel gear 15, and this bevel gear 15 engages with the bevel gear 18 fixed on the shaft 17 of the motor 16 mounted on the cradle 4 to thereby transmit the rotation of the motor 16 to the sprocket 14, whereby the chain 11 driven by the rotation of the sprocket 14 makes the cutter heads 6, 6' travel in the direction opposite to each other along the guide rails 5, 5'. Accordingly, subject to switchover of the rotatory direction of the motor 16 the cutter heads 6, 6' reciprocate in the directions opposite to each other along the guide rails 5, 5'.

The cutter head 6' is identical with the cutter head 6 in construction, and therefore the construction of the cutter head herein will be explained in reference to said cutter head 6. As shown in FIGS. 3 and 4, a tripper base 20 is fixed on the carriage 19, and in the opening formed between said carriage 19 and the tripper base 20 there is inserted the vertically movable cutter carrier 8, the lower end of said cutter carrier 8 being provided with the cutter holder 21 equipped with the cutter 7. The movement of the cutter heads 6, 6' is smoothly effected by virtue of the engagement of the rollers 22 equipped on the upper part and the lower part of the carriage 19 with the upper slant face and the lower slant face of the guide rails 5, 5'. The ascent and descent of the cutter carriers 8, 8' is smoothly effected by virtue of the engagement of four guide rollers 23 installed on the carriage 19 with the grooves provided on both sides of the cutter carriers 8, 8'.

The tripper plate 24 is provided with a slant face 25 formed on its lower part, a notch 26 formed on the upper side edge of said slant face 25, and a bent portion 27 adjoining said notch 26 and having its upper part projected outward. This tripper plate 24 is oscillatingly installed on the tripper base 20 by the pin 28, and by virtue of the engagement and disengagement of the pin 30 equipped on the cutter carriers, 8 8' with and from said notch 26, it functions as a tripper.

The spiral spring 29 winds around the pin 28 and one end of said spiral spring 29 engages with the pin 31 equipped on the tripper base 20 while the other end engages with the pin 32 equipped on the tripper plate 24, whereby it functions to impart a constant turning effort for counterclockwise rotation in FIG. 3 to the tripper plate 24 and, at the same time, to press said tripper plate 24 against the tripper base 20.

On the upper part of the cutter carrier 8 there is perpendicularly installed the stand 33, and the middle of this stand 33 is equipped with the bracket 34, said bracket 34 being provided with the adjusting bolt 35 and nut 36. The tip of the adjusting bolt 35 is provided with a small hole to engage with one end of the spring 37, and the other end of said spring 37 engages with the pin 38 installed on the carriage 19. The spring 37 functions to constantly pull the cutter carrier 8 downward, whereby the cutter 7 is pressed against the surface of glass sheet on the occasion of scoring the glass sheet 1.

At this, through the adjustment of the tension of the spring 37 by operating the nut 36, it is possible to apply an appropriate pressure for scoring to the glass sheet 1 in proportion to the thickness of the glass sheet 1 to be subjected to scoring.

Besides, at the back of the cutter carrier 8, the shaft 39 penetrating the opening of the carriage 19 is fatened with the nut 40 as shown in FIG. 6, and on said shaft 39 there is installed the axially slidable roller 41. Also at the back of the cutter carrier 8, the corrugated leaf spring 42 covering the circumference of the roller 41 is installed above the shaft 39 in order to prevent axial displacement of the roller 41 due to oscillation at the time of reciprocating motion of the roller or the like.

Next, the functional relations of the roller 41, tripper plate 24, pin 30 and cutter holder 21 in the cutter head 6 will be discussed with reference to FIG. 5.

In FIG. 5, (W) is a plane figure illustrative of the change in condition of the cams 9, 10 and the roller 41 at different points of time, namely (A) - (H), (X) is a front view corresponding to (W), (Y) is illustrative of the change in condition of the tripper plate 24, pin 30 and pin 31 at different points of time, namely (A) - (H), and (Z) is illustrative of the relative positions of the cutter 7 and the glass sheet 1 wherein the solid line represents the condition at the time of forward stroke and the dotted line represents the condition at the time of backward stroke.

A. in the drawing represents the condition of each part before the start of scoring with the cutter 7. At this point of time, the pin 30 equipped on the cutter carrier 8 is engaged with the notch 26 of the tripper plate 24 and the cutter carrier 8 is elevated and held in a position away from the side edge of the glass sheet 1, so that the cutter 7 equipped on the tip of the cutter holder 21 installed on the lower part of the cutter carrier 8 is not in touch with the glass sheet 1. And, the roller 41 installed on the back side of the cutter carrier 8 is in the position shown by the solid line in FIG. 6 and is held in the dent of the spring 42.

At this, when the motor 16 is run in the normal direction in order to start the scoring with the cutter 7, or the forward stroke of the cutter 7, the chain 11 moves with the rotation of the sprocket 14 and the cutter head 6, or the cutter carrier 8, moves to the right in FIGS. 1 and 2. As a result, the roller 41 of the cutter carrier 8 rolls on the outside passage 43 of the cam 9 having an elevation substantially equal to that of the roller 41 shown in (A) in such a way as shown in (B), and the tripper plate 24, pin 30 and the cutter holder 21 also move to the right while retaining the same condition as shown in (A).

Then, the roller 41 mounts the projection 44 as shown in (C), thereby elevating the cutter carrier 8, so that the pin 30 ascends along the side edge of the bent portion 27 of the tripper plate 24 to be released from engagement therewith, the tripper plate 24 turns counterclockwise centering on the pin 28 by the action of the spring 29, the pin 30 passes to the back side of the bent portion 27 of the tripper plate 24, and the tripper plate 24 engages with the pin 31 to stop turning.

Subsequently, the roller 41 gradually descends while moving to the right along the slant face 45 of the cam 9 as shown in (D), the cutter carrier 8 starts descending by virtue of its own weight coupled with the tensile force of the spring 37, the pin 30 descends along the back side of the tripper plate 24 while pushing out to the fore the tripper plate 24 pressed by the spring 29 against the tripper base 20 in defiance of the action of the spring 29. Accordingly, even after the disengagement of the pin 30 from the tripper plate 24, the cutter carrier 8 continues to descend until the cutter 7 equipped on the tip of the cutter holder 21 installed on the lower end of said cutter carrier 8 comes in touch with the glass sheet 1 and starts scoring the glass sheet 1.

Next, the roller 41 parts from the cam 9, the cutter 7 is pressed against the glass sheet 1 and moves to the right while scoring the glass sheet 1. Upon arrival at the right-hand extremity of the glass sheet 1, the roller 41 mounts the slant face 46 of the cam 10. (E) is illustrative of the condition at this time.

Subsequently, the roller 41 gradually ascends while moving to the right along the slant face 46 of the cam 10. With this movement, the cutter carrier 8, or the pin 30, ascends, the cutter 7 parts from the glass sheet 1, and at the same time, the pin 30 ascends along the slant face 25 of the tripper plate 24, thereby turning the tripper plate 24 clockwise in defiance of the action of the spring 29. In this way, as shown in (F), simultaneously with the arrival of the roller 41 at the starting point of the horizontal passage 47 on the cam 10, the pin 30 arrives at the upper end of the slant face 25, the turning effort of the pin 30 to turn the tripper plate 24 clockwise is eliminated and the tripper plate 24 turns counterclockwise by the action of the spring 29, and the pin 30 gets in the notch 26 to come in contact with the left-side edge of the bent portion 27. The elevation of the horizontal passage 47 of the cam 10 is equal to that of the horizontal passage 43 and 49 of the cam 9, the outer side of the cam 10 is provided with the projection 52 and its front constitutes the slant face 48 sloping inward, so that the roller 41 is pushed inward along the horizontal passage 47 as it moves, whereby the roller 41 is displaced from the position expressed by the solid line to the position expressed by the dotted line in FIG. 6 along the shaft 39. In other words, the roller 41 is moved from the outside passage to the inside passage, where it engages with the second dent of the spring 42 and is held in this position.

While retaining this condition the roller 41 parts from the cam 10 and comes to the position shown in (G). At this, the motor 16 is stopped.

In the present apparatus, while the cutter 7 is scoring the glass sheet 1 in its forward stroke as set forth above, the other cutter 7' is in the course of backward stroke in the opposite direction. This backward stroke will be explained hereunder with reference to the movement of the cutter 7 subsequent to completion of the forward stroke.

The cutter head 6 held in the condition shown in (G) is moved to the left in FIGS. 1 and 2, or in the opposite direction of the forward stroke, by reversing the rotation of the motor 16.

At the time of this backward stroke, the roller 41 is to move along the inside passage of the cams 10, 9. Inasmuch as these passages are not provided with any projections other than the projection 51 of the cam 9 and the roller 41 is never elevated any further, the cutter head 6 moves from the position in (G) while retaining the same condition as that in (G), that is, the condition wherein the cutter 7 is away from the plane of the glass sheet 1 as shown in (H). Next, the roller 41 moves along the inside passage 49 of the cam 9 to come in contact with the projection 51 and is pushed away from the inside passage 49 toward the outside passage 43 by the slant face 50 of said projection 51, whereby the roller 41 is displaced from the position expressed by the dotted line to the position expressed by the solid line along the shaft 39 in FIG. 6 and returns to the condition (A) at the start of forward stroke. At this, the motor is stopped.

By the repetition of the above described operations, alternate scorings of the glass sheet 1 can be performed with the cutter 7 or 7', and the motor 16 is to be operated either manually or automatically, as occasion demands, by the use of a proper controlling mechanism not shown in the drawings.

Although particular preferred embodiments of the invention have been disclosed hereinabove for the purpose of illustration, it will be understood that variations or modifications thereof which lie within the scope of the present invention as defined by the appended claims are fully contemplated.

What is claimed is:

1. An apparatus for scoring a moving strip of glass sheet, comprising a set of cutters capable of reciprocating motion along a set of guide rails so installed as to stretch over said moving strip of glass sheet, said cutters touching and scoring the strip of glass sheet at the time of forward stroke and being parted from the strip of glass sheet to return to the original position thereof without scoring the strip of glass sheet at the time of backward stroke, the set of guide rails including two guide rails, one being in front and the other in the rear relative to the direction of movement of the strip of glass sheet, and said set of cutters including two cutters, each being mounted on the respective guide rail to be capable of reciprocating motion along the guide rail simultaneously and in opposite directions in such a fashion that when one cutter reaches the terminal point for scoring the other cutter reaches the starting point for scoring, and said two cutters being interconnected by means of a chain, said chain being devised as to be operated by means of a drive device.

2. An apparatus for scoring a moving strip of glass sheet, comprising a set of cutters capable of reciprocating motion along a set of guide rails so installed as to stretch over said moving strip of glass sheet, said cutters touching and scoring the strip of glass sheet at the time of forward stroke and being parted from the strip of glass sheet to return to the original position thereof without scoring the strip of glass sheet at the time of backward stroke, the set of guide rails including two guide rails, one being in front and the other in the rear relative to the direction of movement of the strip of glass sheet, and said set of cutters including two cutters, each being mounted on the respective guide rail to be capable of reciprocating motion along the guide rail simultaneously and in opposite directions in such a fashion that when one cutter reaches the terminal point for scoring the other cutter reaches the starting point for scoring, each said guide rail being provided with a set of different cams installed in the proximity of its two extremities and disposed for engaging the respective reciprocating cutter, said cutter being provided with a vertically movable cutter carrier having a cutter element fixed on its lower end and a tripper member for the purpose of holding said cutter carrier in an elevated position, the cutter carrier being equipped with a cam follower, whereby engagement of said cam follower with said set of different cams adjacent one end of the rail causes the cutter carrier to be elevated and held in the thus elevated position by said tripper member during the backward stroke, and whereby engagement of said cam follower with said set of cams adjacent the other end of said rail releases the cutter carrier from the tripper member and permits the cutter carrier to descend so that the cutter element engages the glass sheet during the forward stroke.

3. An apparatus for scoring a moving strip of glass sheet, comprising:

first and second elongated rail means extending across said glass sheet in a transverse direction with respect to the direction of movement of said glass sheet, said first and second rail means being substantially parallel and positioned adjacent one another in side-by-side relationship;

means fixedly mounting said first and second rail means in a stationary position so that said rail means stretch across said glass sheet;

first and second cutter means movably supported for reciprocating movement along said first and second rail means, respectively, each of said cutter means including a cutter element adapted for engagement with said glass sheet for scoring same;

drive means drivingly connected to said first and second cutter means for causing simultaneous reciprocating movement of said first and second cutter means along their respective rail means in opposite directions;

each said cutter means including a carriage movably supported on the respective rail means for reciprocating movement therealong, whereby the drive means causes the cutter carriage associated with each cutter means to be moved throughout a forward stroke in one direction across said glass sheet and then throughout a backward stroke in the opposite direction across said glass sheet during each cycle of reciprocating movement of the respective cutter means, said drive means causing the cutter carriage associated with said first cutter means to be moved in its forward stroke simultaneous with the movement of the cutter carriage associated with said second cutter means in its backward stroke; and control means associated with each said rail means and coacting with the respective cutter means (1) for causing lowering of the cutter element when the respective cutter means is adjacent one end of said respective rail means so that said cutter element scores said glass sheet during said forward stroke, (2) for raising said cutter element upwardly out of engagement with said glass sheet when said respective cutter means is located adjacent the other end of said respective rail means, and (3) for holding said cutter element in said raised position out of engagement with said glass sheet as said respective cutter means is moved along said respective rail means during said backward stroke.

4. An apparatus according to claim 3, wherein said drive means includes a common drive motor and intermediate drive transmitting means connected between said motor and said first and second cutter means for causing simultaneous linear movement of said first and second cutter means in opposite directions so that when each said cutter means is momentarily stopped so as to permit reversal in the linear direction of movement thereof, the two said cutter means are disposed on opposite sides of said sheet.

5. An apparatus according to claim 3, wherein said control means includes first means associated with one end of said first rail means and coacting with said first cutter means for causing lowering of said cutter element into engagement with said glass sheet when said first cutter means is located adjacent one side of said glass sheet, said control means including second means associated with the other end of said first rail means and coacting with said first cutter means for raising said cutter element upwardly out of engagement with said glass sheet, whereby movement of said first cutter means along said first rail means in a direction from said one end thereof toward the other end thereof results in said cutter element engaging and scoring said glass sheet during the forward stroke of said first cutter means, said control means still further including holding means coacting with said first cutter means for maintaining said cutter element in a raised position during the backward stroke of said first cutter means from said other end of said first rail means toward said one end of said first rail means, and said control means including substantially identical structure associated with said second rail means for controlling the position of the cutter element associated with said second cutter means.

6. An apparatus according to claim 5, wherein each said cutter means includes a cutter carrier having the respective cutter element mounted on the lower end thereof, said cutter carrier being slidably mounted on the respective cutter carriage for movement in a direction toward and away from the surface of said glass sheet.

7. An apparatus according to claim 6, wherein said first and second means respectively comprise first and second cams associated with the opposite ends of the respective rail means, said first and second cams coacting with the respective cutter carrier for respectively lowering and raising said carrier, and said holding means including a latchlike member coacting between said cutter carriage and said cutter carrier for holding said cutter carrier in its uppermost position during the backward stroke of the respective cutter means.

8. An apparatus according to claim 7, wherein each cutter carrier has cam follower means mounted thereon and positioned for engagement with said first and second cams, each of said first and second cams including first and second cam portions which are disposed in side-by-side relationship in a direction which extends substantially perpendicular to the longitudinal direction of the respective rail means, and the cam follower means being shiftable in said perpendicular direction relative to its respective cutter carrier between first and second positions so that the cam follower means will engage one cam portion associated with the respective cam when the cutter means is moving in the forward stroke and the cam follower means will be shifted into the other position and engage the other cam portion when the cutter means is being moved in the backward stroke.

* * * * *